(12) United States Patent
Matsuzaki

(10) Patent No.: US 10,808,811 B2
(45) Date of Patent: Oct. 20, 2020

(54) MOVEMENT DEVICE

(71) Applicant: KABUSHIKI KAISHA TOKAI-RIKA-DENKI-SEISAKUSHO, Aichi-ken (JP)

(72) Inventor: Makoto Matsuzaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 100 days.

(21) Appl. No.: 15/856,198

(22) Filed: Dec. 28, 2017

(65) Prior Publication Data

US 2018/0202523 A1 Jul. 19, 2018

(30) Foreign Application Priority Data

Jan. 13, 2017 (JP) .................................. 2017-004563

(51) Int. Cl.
*B60R 22/26* (2006.01)
*F16H 25/20* (2006.01)
*B60R 22/18* (2006.01)

(52) U.S. Cl.
CPC ............. *F16H 25/20* (2013.01); *B60R 22/26* (2013.01); *F16H 25/2015* (2013.01); *B60R 2022/1806* (2013.01); *F16H 2025/2031* (2013.01); *F16H 2025/2075* (2013.01)

(58) Field of Classification Search
CPC ... B60R 22/03; B60R 22/06; B60R 2022/021; B60R 2022/1806; B60R 22/26; F16H 2025/2075; F16H 25/2015; F16H 2025/2031
See application file for complete search history.

(56) References Cited

U.S. PATENT DOCUMENTS

| | | | | |
|---|---|---|---|---|
| 7,997,620 | B1* | 8/2011 | Dong | B60R 22/03 280/801.2 |
| 8,317,228 | B2* | 11/2012 | Mages | B60R 22/1951 280/806 |
| 8,496,269 | B2* | 7/2013 | Holbein | B60R 22/03 280/806 |
| 2015/0323049 | A1* | 11/2015 | Rousseau | F16H 25/20 74/89.37 |
| 2017/0297527 | A1 | 10/2017 | Ots et al. | |

FOREIGN PATENT DOCUMENTS

| | | |
|---|---|---|
| JP | H039950 U | 1/1991 |
| JP | 2008256024 A | 10/2008 |
| JP | 2012-131360 A | 7/2012 |
| JP | 2016022855 A | 2/2016 |
| JP | 2016046255 A | 4/2016 |

OTHER PUBLICATIONS

Japanese Office Action issued in Application No. 2017-004563 dated Jun. 5, 2018.

* cited by examiner

*Primary Examiner* — Randell J Krug
(74) *Attorney, Agent, or Firm* — Roberts Calderon Safran & Cole P.C.

(57) ABSTRACT

At a lift-up buckle device, due to a motor being driven and an output shaft of the motor being rotated, a drive screw is rotated. Further, a supporting tube rotatably supports a rear end portion of the drive screw. Here, the output shaft rotatably supports a front end portion of the drive screw. Therefore, offset between a rotation central axis of the output shaft and a rotation central axis of the drive screw can be suppressed.

8 Claims, 2 Drawing Sheets

FIG.2B

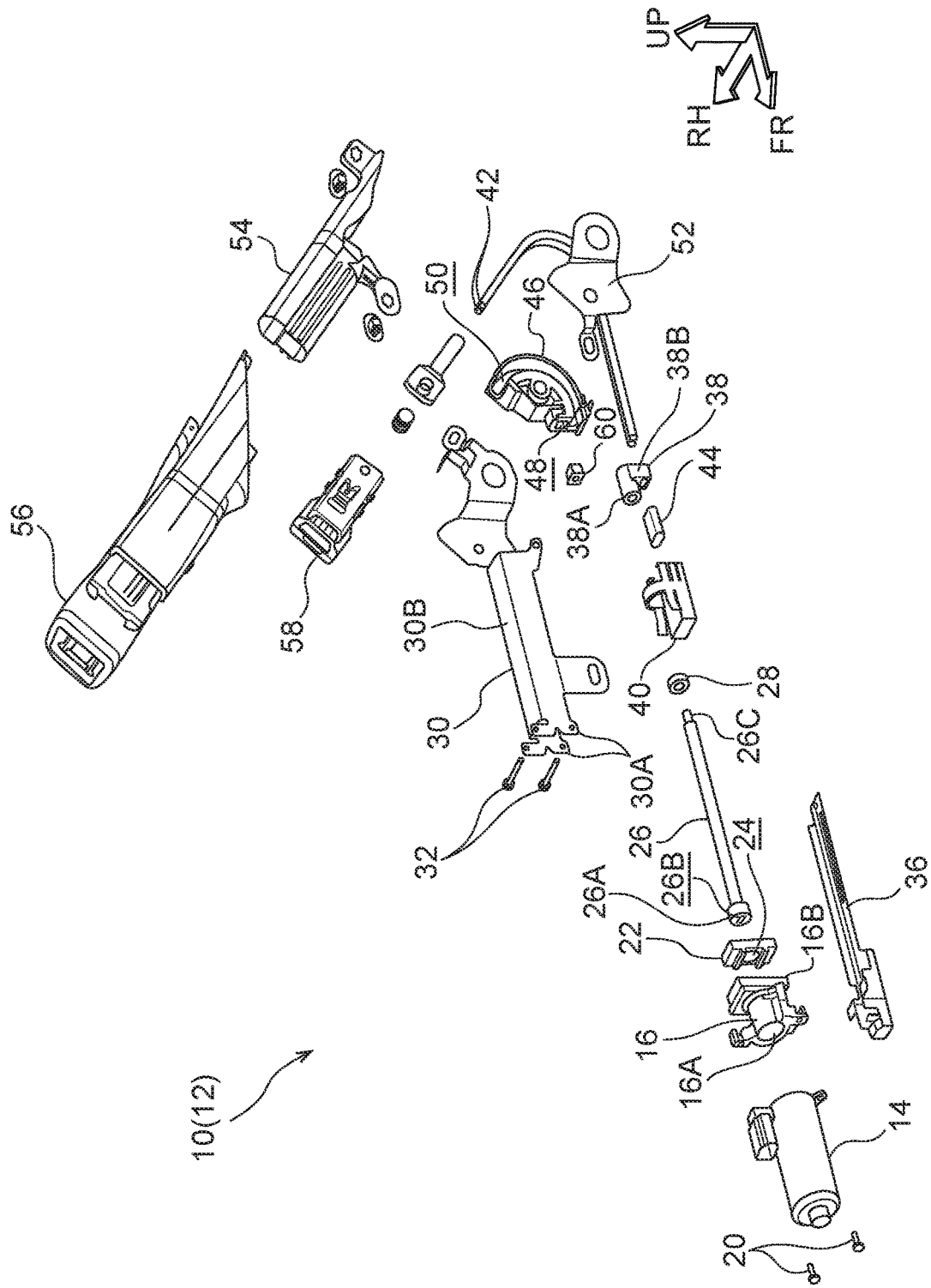

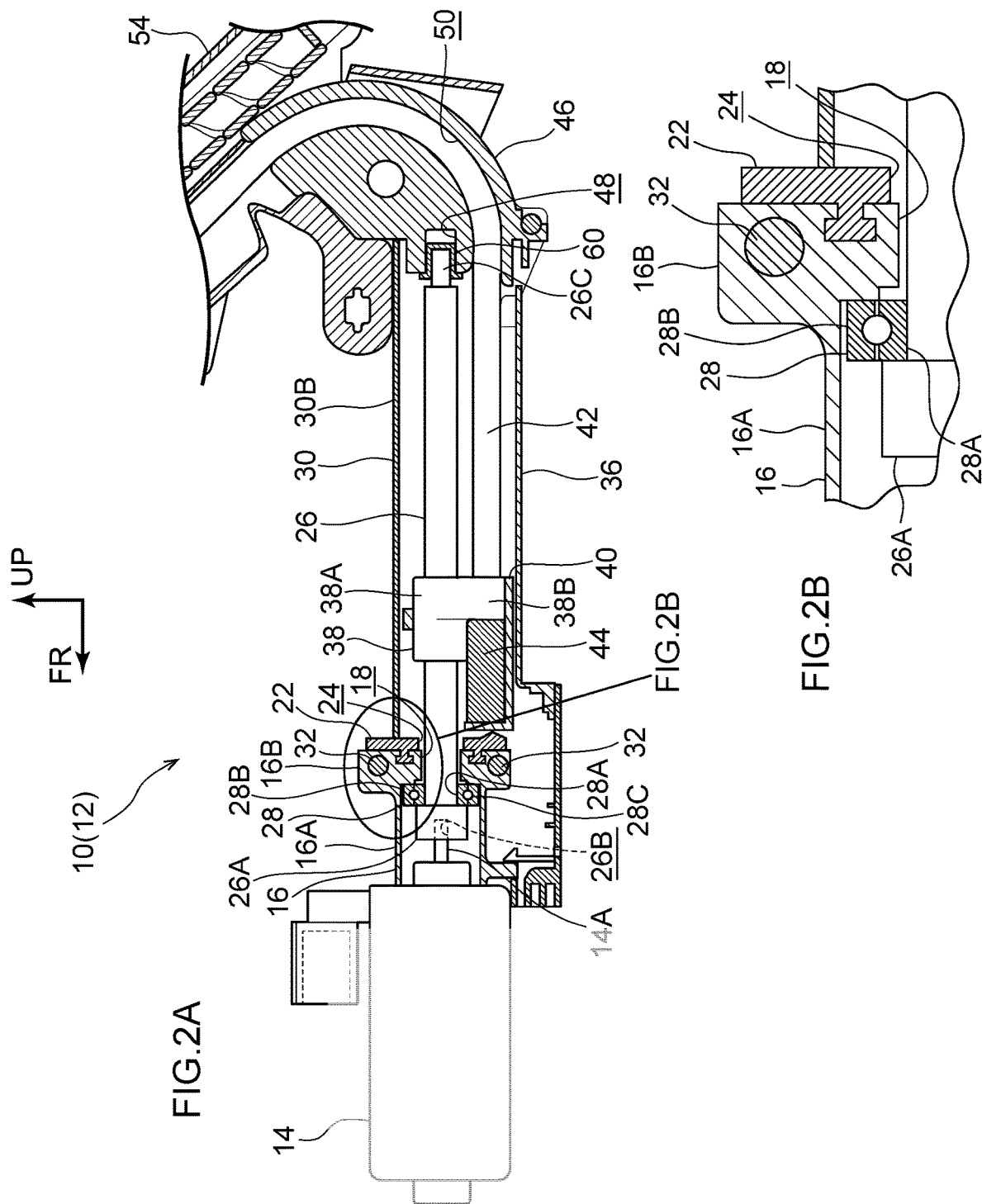

MOVEMENT DEVICE

CROSS-REFERENCE TO RELATED APPLICATION

This application is based on and claims priority under 35 USC 119 from Japanese Patent Application No. 2017-4563 filed on Jan. 13, 2017, the disclosure of which is incorporated by reference herein.

BACKGROUND

Technical Field

The present invention relates to a movement device in which a rotating member is rotated and a moving body is moved.

Related Art

In the buckle movement device disclosed in Japanese Patent Application Laid-Open (JP-A) No. 2012-131360, due to a motor being driven and a screw joint being rotated, a drive screw is rotated, and an anchor slider is moved. Further, the drive screw is rotatably supported by a first bush and a second bush.

Here, in such a buckle movement device, it is preferable to suppress offset between the rotation central axis of the screw joint and the rotation central axis of the drive screw.

SUMMARY

In view of the above-described circumstances, an object of the present invention is to provide a movement device that can suppress offset between the rotation central axis of a supporting member and the rotation central axis of a rotating member.

A movement device of a first aspect of the present invention comprises a rotating member that is provided at a seatbelt device, and that is rotatable; a supporting body that rotatably supports the rotating member; driving means provided with a supporting member that rotatably supports the rotating member, the supporting member being rotated by the driving means being driven, whereby the rotating member is rotated; and a moving body that is provided at the rotating member, and that is moved by the rotating member being rotated.

In the movement device of the first aspect of the present invention, the rotating member is provided at a seatbelt device, and the moving body is provided at the rotating member. By the driving means being driven and the supporting member of the driving means being rotated, the rotating member is rotated, and the moving body is moved. Further, the supporting body rotatably supports the rotating member.

Here, the supporting member of the driving means rotatably supports the rotating member. Therefore, offset between the rotation central axis of the supporting member and the rotation central axis of the rotating member can be suppressed.

A movement device of a second aspect of the present invention comprises, in the movement device of the first aspect of the present invention, a rotation supporting body provided with a rotating portion, which is rotated together with the rotating member, and a supporting portion, which is supported rotatably relative to the rotating portion; and a restricting body that restricts movement of the supporting portion, and that restricts movement of the rotating member in a rotation axial direction.

In the movement device of the second aspect of the present invention, the rotation supporting body is provided with the rotating portion and the supporting portion. The rotating portion is rotated together with the rotating member. The supporting portion is supported rotatably relative to the rotating portion.

Here, the restricting body restricts movement of the supporting portion and restricts movement of the rotating member in the rotation axial direction. Therefore, at the time when the restricting body restricts movement of the rotating member in the rotation axial direction, the supporting portion sliding with respect to the restricting body can be suppressed, and generation of sliding noise between the restricting body and the rotation supporting body can be suppressed.

BRIEF DESCRIPTION OF THE DRAWINGS

Exemplary embodiments of the present invention will be described in detail based on the following figures, wherein:

FIG. 1 is an exploded perspective view seen from an oblique front and left side and showing a lift-up buckle device relating to an embodiment of the present invention;

FIG. 2A is a cross-sectional view in which the lift-up buckle device relating to the embodiment of the present invention is seen from the left, and FIG. 2B is an enlargement of the area circled in phantom in FIG. 2A.

DETAILED DESCRIPTION

A lift-up buckle device 10, which serves as a movement device relating to an embodiment of the present invention, is shown in FIG. 1 in an exploded perspective view seen from an oblique front and left side. The lift-up buckle device 10 is shown in FIG. 2A in a cross-sectional view seen from the left. Note that, in the drawings, the front of the lift-up buckle device 10 is indicated by arrow FR, the right of the lift-up buckle device 10 is indicated by arrow RH, and the upward direction of the lift-up buckle device 10 is indicated by arrow UP.

The lift-up buckle device 10 relating to the present embodiment structures a seatbelt device 12 of a vehicle (an automobile). The seatbelt device 12 is applied to a seat (not illustrated) that is within a vehicle cabin. A seating sensor (not illustrated) is provided at the seat. The seating sensor detects that a vehicle occupant is seated in the seat, and is electrically connected to a control device (not illustrated).

The seatbelt device 12 has a take-up device (not shown). The take-up device is fixed to the vehicle transverse direction outer side and the lower side of the seat rear portion. A webbing (a seatbelt, not illustrated), which is shaped as an elongated strip, is taken-up from the proximal end side thereof by the take-up device, and the webbing is pulled-out from the take-up device. At further toward the distal end side than the take-up device, the webbing is movably passed-through a through-anchor (not illustrated). The through-anchor is supported at the vehicle transverse direction outer side and the upper side of the seat rear portion. The distal end of the webbing is fixed to an anchor (not illustrated), and the anchor is fixed to the vehicle transverse direction outer side and the lower side of the seat rear portion. Further, the portion of the webbing between the through-anchor and the anchor is movably inserted-through a tongue (not illustrated).

The lift-up buckle device 10 is fixed to the vehicle transverse direction inner side and the lower side of the seat. The forward, rightward and upward directions of the lift-up buckle device 10 are directed in the forward, rightward and upward directions of the vehicle, respectively.

As shown in FIG. 1 and FIG. 2A, a motor 14 serving as a driving means is provided at the front end portion of the lift-up buckle device 10. An output shaft 14A, which is substantially cylindrical and is made of metal and serves as a supporting member, is provided at the motor 14. The output shaft 14A is supported (axially supported) so as to be able to rotate around the central axis. The output shaft 14A projects-out toward the rear. The rear end portion (the distal end portion) of the output shaft 14A is formed in the shape of a rectangular pillar, and is disposed coaxially with the portion other than the rear end portion of the output shaft 14A. The motor 14 is electrically connected to the aforementioned control device. The output shaft 14A is rotated in one direction and in another direction, respectively, due to the motor 14 being driven forward and driven reversely by control of the control device.

A housing 16, which is made of metal and serves as a restricting body, is disposed at the rear side of the motor 14. The motor 14 is fixed to the housing 16 by, for example, a pair of screws 20. An insertion tube 16A that is substantially shaped as a cylindrical tube is provided at the front side portion of the housing 16, and the output shaft 14A of the motor 14 is coaxially inserted within the insertion tube 16A.

A restricting block 16B, which is substantially rectangular parallelepiped and serves as a restricting portion, is provided at the rear end portion of the housing 16. An insert-through hole 18 that is circular is formed so as to pass-through the central portion of the restricting block 16B. The insert-through hole 18 communicates coaxially with the interior of the insertion tube 16A. The diameter dimension of the insert-through hole 18 is made to be smaller than the diameter dimension of the interior of the insertion tube 16A.

A damper 22, which is substantially rectangular plate-shaped and serves as an absorbing body, is mounted to the rear side of the housing 16. The damper 22 is made of rubber and is elastic. A through-hole 24 that is circular is formed so as to pass-through the central portion of the damper 22. The through-hole 24 communicates coaxially with the insert-through hole 18 of the restricting block 16B.

A drive screw 26, which is substantially cylindrical and is made of metal and serves as a rotating member, is coaxially inserted within the insertion tube 16A of the housing 16, and the insert-through hole 18, and the through-hole 24 of the damper 22. The drive screw 26 is disposed such that the axial direction thereof is parallel to the front-rear direction, and extends-out toward the rear from the damper 22. A front end portion 26A (an axial direction one end portion) of the drive screw 26 is formed to have an enlarged diameter. The front end portion 26A of the drive screw 26 is disposed coaxially with the portions other than the front end portion 26A of the drive screw 26. A supporting hole 26B that is rectangular is formed in the front end portion 26A of the drive screw 26. The supporting hole 26B is disposed coaxially with the drive screw 26, and opens to the front. The rear end portion of the output shaft 14A of the motor 14 is fit-together with the supporting hole 26B. Due thereto, the output shaft 14A supports (axially supports) the front end portion 26A of the drive screw 26 so as to be integrally rotatable around the central axis, and the drive screw 26 is disposed coaxially with the output shaft 14A. Further, a male screw is formed at the outer periphery of the drive screw 26, except for at the front end portion 26A and a rear end portion 26C (an axial direction another end portion).

The portion, which is further toward the rear side than the front end portion 26A, of the drive screw 26 is fit-together with the interior of a ball bearing 28 that is substantially shaped as a cylindrical tube and is made of metal and serves as a rotation supporting body. The ball bearing 28 is supported by the drive screw 26 (does not support the drive screw 26), and is disposed at the rear end portion of the interior of the insertion tube 16A of the housing 16. An inner wheel 28A, which is substantially shaped as a cylindrical tube and serves as a rotating portion, is provided coaxially at the radial direction inner side portion of the ball bearing 28. The drive screw 26 is fit-together with the interior of the inner wheel 28A, and the inner wheel 28A is able to rotate integrally with the drive screw 26 around the central axis. At the front side thereof, the inner wheel 28A contacts the front end portion 26A of the drive screw 26, and, at the rear side thereof, the inner wheel 28A faces the insert-through hole 18 of the housing 16. An outer wheel 28B, which is substantially shaped as a cylindrical tube and serves as a supporting portion, is provided coaxially at the radial direction outer side portion of the ball bearing 28. As best seen in FIG. 2B, the outer wheel 28B is separated from the inner wheel 28A and the insertion tube 16A in the radial direction. The outer wheel 28B is disposed at the radial direction outer sides of the front end portion 26A of the drive screw 26 and the insert-through hole 18 of the housing 16. At the front side thereof, the outer wheel 28B does not contact the front end portion 26A of the drive screw 26, and, at the rear side thereof, the outer wheel 28B faces the restricting block 16B of the housing 16. Plural balls 28C, which are spherical and serve as intermediate portions, are provided at the radial direction intermediate portion of the ball bearing 28. The plural balls 28C are disposed at uniform intervals along the peripheral direction of the ball bearing 28. The plural balls 28C are fit-together between the inner wheel 28A and the outer wheel 28B, and, due thereto, relative movement between the inner wheel 28A and the outer wheel 28B in the radial direction and in the axial direction is restricted. The outer wheel 28B is supported by the inner wheel 28A via the plural balls 28C. The inner wheel 28A and the outer wheel 28B can rotate relative to one another around the central axis while the plural balls 28C are rolled.

A rail 30, which is made of metal and serves as a guiding body, is disposed at the rear side of the housing 16. A pair of assembly plates 30A that are shaped as elongated, substantially rectangular plates are provided at the front end of the rail 30. The assembly plates 30A are disposed at the left side and the right side of the restricting block 16B of the housing 16. The rails 30 are assembled to the restricting block 16B due to bolts 32 being passed, in the left-right direction, through the restricting block 16B and the pair of assembly plates 30A at the upper end portions and lower end portions thereof, and nuts (not illustrated) being screwed together with the bolts 32, and the restricting block 16B and the pair of assembly plates 30A being nipped between the head portions of the bolts 32 and the nuts.

A rail portion 30B, which serves as a guiding portion and is shaped as an elongated plate that is U-shaped in cross-section, is provided at the rear side of the pair of assembly plates 30A. The left wall and the right wall of the rail portion 30B are respectively made integral with the assembly plates 30A, and the interior of the rail portion 30B opens toward the lower side. The drive screw 26 is accommodated in the interior of the rail portion 30B, and the rail portion 30B is disposed parallel to the drive screw 26. Further, a rail cover 36, which is shaped as an elongated, substantially rectangular plate and is made of resin and serves as a covering member, is fixed to the lower side of the rail portion 30B. The rail cover 36 covers the rail portion 30B interior from the lower side.

A slider 38, which is made of metal and serves as a moving member that structures a moving body, is disposed at the interior of the rail portion 30B. An engaging portion 38A that is substantially shaped as a cylindrical tube is provided at the upper side portion of the slider 38. A female screw is formed at the inner peripheral surface of the engaging portion 38A. The drive screw 26 is coaxially inserted-through the interior of the engaging portion 38A, and the female screw is screwed together with the male screw of the drive screw 26. A fixing portion 38B that is substantially rectangular parallelepiped is provided integrally with the rear side portion of the engaging portion 38A. The fixing portion 38B projects-out toward the lower side from the engaging portion 38A.

A shoe 40, which is substantially box-shaped and is made of resin and serves as a peripheral member that structures the moving body, is fit-together with the periphery of the slider 38. Movement (including rotation) of the shoe 40 with respect to the slider 38 is limited. The left wall and the right wall of the shoe 40 contact the left wall and the right wall of the rail portion 30B of the rail 30 respectively. Due to the drive screw 26 being rotated, the shoe 40 and the slider 38 are moved integrally in the front-rear direction while being guided by the rail portion 30B.

The proximal end portions (front side end portions) of a pair of wires 42 that serve as connecting members are passed-through the fixing portion 38B of the slider 38. The proximal end portions of the pair of wires 42 are fixed to the fixing portion 38B by caulking or the like of the fixing portion 38B, and the wires 42 can move integrally with the slider 38. A piece 44 is fixed to the pair of wires 42 at the front side of the fixing portion 38B, and the piece 44 is accommodated within the shoe 40.

A wire guide 46, which is block-shaped and is made of metal and serves as a guiding member, is fixed to the rear end of the rail portion 30B of the rail 30. The wire guide 46 is substantially fan-shaped as seen in side view.

A shaft supporting hole 48 that is rectangular is formed in the front end of the lower portion of the wire guide 46, and the shaft supporting hole 48 opens toward the front side. A supporting tube 60, which is shaped as a tube having a bottom and is made of resin and serves as a supporting body, is inserted in the shaft supporting hole 48, and the interior of the supporting tube 60 opens toward the front side. The outer peripheral surface of the supporting tube 60 is rectangular in cross-section. The supporting tube 60 is fit-together with the shaft supporting hole 48, and rotation of the supporting tube 60 around the central axis is restricted. The inner peripheral surface of the supporting tube 60 is circular in cross-section. The rear end portion 26C of the drive screw 26 is fit-together with the interior of the supporting tube 60, and the rear end portion 26C of the drive screw 26 is supported (axially supported) so as to be able to rotate around the central axis.

A guide groove 50 is formed in the wire guide 46, and the guide groove 50 opens toward the left side. The guide groove 50 is curved as seen in a side view. The lower end portion of the guide groove 50 opens toward the front side, and the upper end portion of the guide groove 50 opens in a direction heading toward the front side while heading toward the upper side. The pair of wires 42 are inserted-through the guide groove 50. The portions, which are further toward the proximal end sides than the wire guide 46, of the pair of wires 42 extend in the front-rear direction. The portions, which are further toward the distal end sides than the wire guide 46, of the pair of wires 42 extend in a direction heading toward the front side while heading toward the upper side. A cover plate 52 that is plate-shaped and made of metal is fixed to the left side of the wire guide 46. The cover plate 52 closes-off the left side of the guide groove 50.

The proximal end portion of a lower cover 54, which is tubular and made of rubber for example, is mounted to the upper portion of the wire guide 46. The lower cover 54 extends in a direction heading toward the front side while heading toward the upper side. The interior of the lower cover 54 communicates with the upper end portion of the guide groove 50 of the wire guide 46, and the pair of wires 42 are inserted-through the lower cover 54 interior.

The distal end side (the upper side and front side) of the lower cover 54 is inserted within a buckle cover 56 that is tubular and is made of resin for example. The buckle cover 56 is made to be hard as compared with the lower cover 54. The buckle cover 56 can slide along the lower cover 54, and the pair of wires 42 are inserted in the buckle cover 56 interior.

A buckle 58 serving as an interlocked body is fixed to the buckle cover 56 interior. The distal end portions (rear side end portions) of the pair of wires 42 are connected to the buckle 58. The buckle cover 56 exposes the buckle 58 at the distal end side (the upper side and the front side), and the aforementioned tongue can be attached to and detached from the buckle 58. A buckle switch (not illustrated) is provided at the buckle 58. The buckle switch detects that the tongue has been attached to the buckle 58, and is electrically connected to the aforementioned control device.

Operation of the present embodiment is described next.

In the lift-up buckle device 10 of the above-described structure, at a time when a vehicle occupant is not seated in the seat (a time when the seating sensor does not detect that a vehicle occupant is seated in the seat), the slider 38 and the shoe 40 are disposed at the front portions of the drive screw 26 and the rail 30, and the buckle cover 56 and the buckle 58 are disposed at a stored position that is at the lower side and the rear side.

When a vehicle occupant sits in the seat (when the seating sensor detects that a vehicle occupant is seated in the seat), due to the control of the control device, the motor 14 is driven forward, and the output shaft 14A and the drive screw 26 are rotated in one direction. Due thereto, the slider 38 and the shoe 40 are moved toward the rear side while guided by the rail portion 30B of the rail 30. Therefore, due to the pair of wires 42 being moved toward the distal end side integrally with the slider 38, the buckle cover 56 and the buckle 58 are moved toward the upper side and the front side, and are disposed at a raised position. Moreover, the webbing is pulled-out from the take-up device, and the tongue of the webbing is attached to the buckle 58. Further, because the tongue is attached to the buckle 58 that is disposed at the raised position, the tongue can be easily attached to the buckle 58.

At the time when the tongue is attached to the buckle 58 (the time when the buckle switch detects the that tongue is attached to the buckle 58), due to control of the control device, the motor 14 is driven reversely, and the output shaft 14A and the drive screw 26 are rotated in the other direction. Due thereto, the slider 38 and the shoe 40 are moved toward the front side while being guided by the rail portion 30B of the rail 30. Therefore, due to the pair of wires 42 being moved toward the proximal end side integrally with the slider 38, the buckle cover 56 and the buckle 58 are moved toward the lower side and the rear side and are disposed at the stored position. Due thereto, the webbing is applied to the vehicle occupant due to the tongue being moved toward the lower side and the rear side together with the buckle 58.

By the way, the supporting tube 60 of the wire guide 46 rotatably supports the rear end portion 26C of the drive screw 26.

Here, the output shaft 14A of the motor 14 rotatably supports the front end portion 26A of the drive screw 26. Therefore, offset between the rotation central axis (the central axis) of the output shaft 14A and the rotation central axis (the central axis) of the drive screw 26 can be suppressed. Due thereto, at the time when the output shaft 14A is rotated by driving of the motor 14, and the drive screw 26 is rotated, generation of contact noise (a striking noise) that is due to the output shaft 14A and the drive screw 26 abutting one another in the rotation peripheral direction can be suppressed.

Moreover, the drive screw 26 is rotatably supported only by the supporting tube 60 of the wire guide 46 and the output shaft 14A of the motor 14, and is not rotatably supported by the ball bearing 28. Therefore, offset between the rotation central axis of the output shaft 14A and the rotation central axis of the drive screw 26 can be suppressed effectively. Due thereto, at the time when the output shaft 14A is rotated due to the driving of the motor 14, and the drive screw 26 is rotated, generation of contact noise that is due to the output shaft 14A and the drive screw 26 abutting one another in the rotation peripheral direction can be suppressed effectively.

Further, at the time when moving force toward the rear side (a rotation axial direction) is applied to the drive screw 26, due to the ball bearing 28 abutting the restricting block 16B of the housing 16, the ball bearing 28 and the drive screw 26 moving toward the rear side is restricted. Therefore, in particular, at the time when the drive screw 26 is rotated, damage to the rear wall (the bottom wall) of the supporting tube 60 by the rear end portion 26C of the drive screw 26 can be suppressed.

Moreover, at the time when moving force toward the rear side is applied to the drive screw 26, and the ball bearing 28 abuts the restricting block 16B of the housing 16, the outer wheel 28B of the ball bearing 28 abuts the restricting block 16B, and the inner wheel 28A of the ball bearing 28 does not abut the restricting block 16B. Therefore, at the time when the ball bearing 28 abuts the restricting block 16B in the state in which the drive screw 26 is rotated, the inner wheel 28A is rotated integrally with the drive screw 26 while the plural balls 28C of the ball bearing 28 roll. Due thereto, the outer wheel 28B being rotated by the rotation of the drive screw 26 is suppressed. Due thereto, the outer wheel 28B sliding with respect to the restricting block 16B can be suppressed, and generation of sliding noise between the restricting block 16B and the ball bearing 28 can be suppressed.

Note that, in the present embodiment, the buckle 58 is moved due to the slider 38 and the shoe 40 (the moving body) being moved. However, the take-up device, the webbing, the through-anchor, the anchor or the tongue may be moved due to the moving body being moved.

What is claimed is:

1. A movement device, comprising:
   a rotating member that is provided at a seatbelt device, and that is rotatable;
   a supporting body that rotatably supports the rotating member;
   driving means provided with a supporting member that rotatably supports the rotating member, the supporting member being rotated by the driving means being driven,
   whereby the rotating member is rotated, and a moving body that is provided at the rotating member is moved by the rotating member being rotated, and
   wherein the rotating member is exclusively rotatably supported in the rotation radial direction of the rotating member by the supporting body at a back end, and is exclusively rotatably supported in the rotation radial direction of the rotating member by the supporting member of the driving means at a front end due to being fitted together with the supporting member so as to rotate integrally with the supporting member.

2. The movement device of claim 1, further comprising:
   a rotation supporting body provided with a rotating portion, which is rotated together with the rotating member, and
   a supporting portion, which is supported rotatably relative to the rotating portion in a rotation radial direction of the rotating portion; and
   a restricting body that restricts movement of the supporting portion, and that restricts movement of the rotating member in a rotation axial direction.

3. The movement device of claim 2, further comprising an intermediate portion that is provided between the rotating portion and the supporting portion, the rotating portion and the supporting portion being rotated relative to one another while the intermediate portion is rotated.

4. The movement device of claim 1, further comprising a ball bearing that circumscribes a front end of the rotating member adjacent to the driving means, wherein an outer circumferential surface of the ball bearing is spaced apart from and does not contact any other component of the movement device in a radial direction, such that the ball bearing does not rotatably support the rotating member in the rotation radial direction of the rotating member.

5. The movement device of claim 1, further comprising a ball bearing that circumscribes a front end of the rotating member adjacent to the driving means, and a tubular housing surrounding the ball bearing, wherein the ball bearing does not contact the surrounding tubular housing and does not rotatably support the rotating member in the rotation radial direction of the rotating member.

6. The movement device of claim 5, wherein the ball bearing includes an inner wheel circumscribing and connected to the rotating member, and an outer wheel that faces and abuts a restricting block circumscribing the rotating member in response to thrust forces applied to the rotating member.

7. A movement device, comprising:
   a rotating member that is provided at a seatbelt device, and that is rotatable;
   a supporting body that rotatably supports the rotating member at a back end;
   driving means provided with a supporting member that rotatably supports the rotating member at a front end, the supporting member being rotated by the driving means being driven,
   a ball bearing that circumscribes a front end of the rotating member adjacent to the driving means, whereby the rotating member is rotated, and a moving body that is provided at the rotating member is moved by the rotating member being rotated, wherein the rotating member is rotatably supported in the rotation radial direction of the rotating member by the supporting body at the back end, and is rotatably supported in the rotation radial direction of the rotating member by the supporting member of the driving means at the front end due to being fitted together with the supporting member so as to rotate integrally with the supporting member, and wherein an outer circumferential surface of the ball bearing is spaced apart from and does not contact any other component of the movement device.

8. The movement device of claim 7, wherein the ball bearing includes an inner wheel circumscribing and connected to the rotating member, and an outer wheel that faces and abuts a restricting block circumscribing the rotating member in response to an axial force applied to the rotating member.

* * * * *